INVENTORS
DALE A. FURLONG
RICHARD D. SMITH

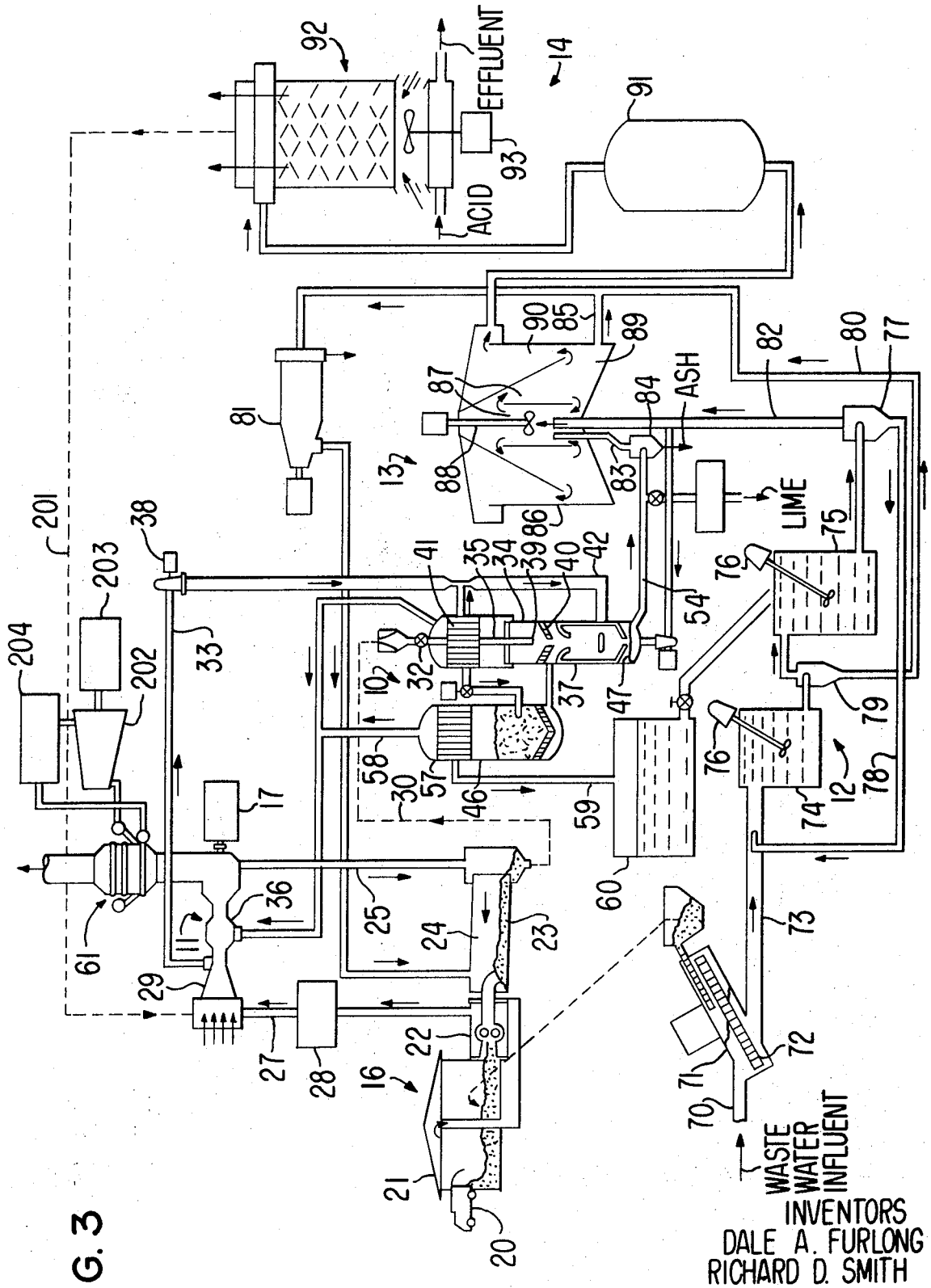

BY Limbach and Limbach

ATTORNEYS

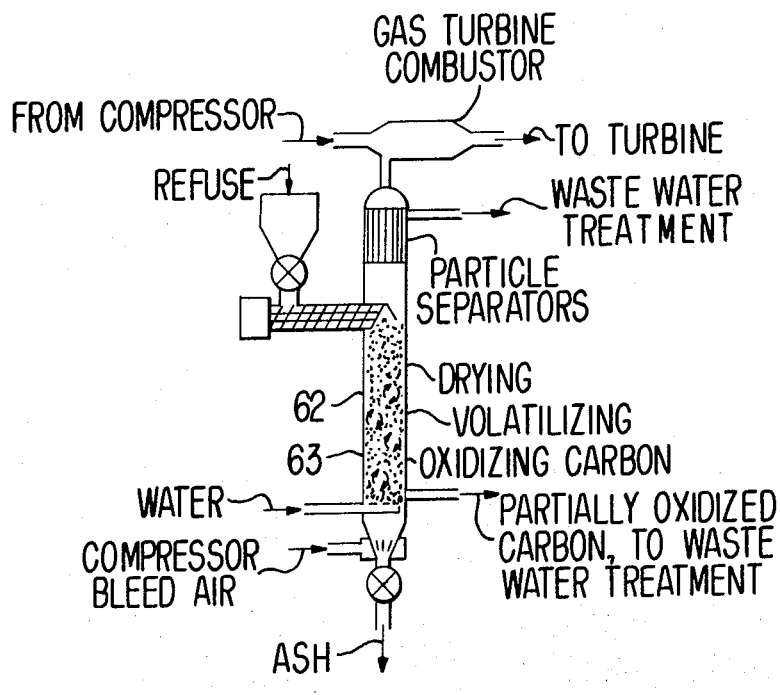
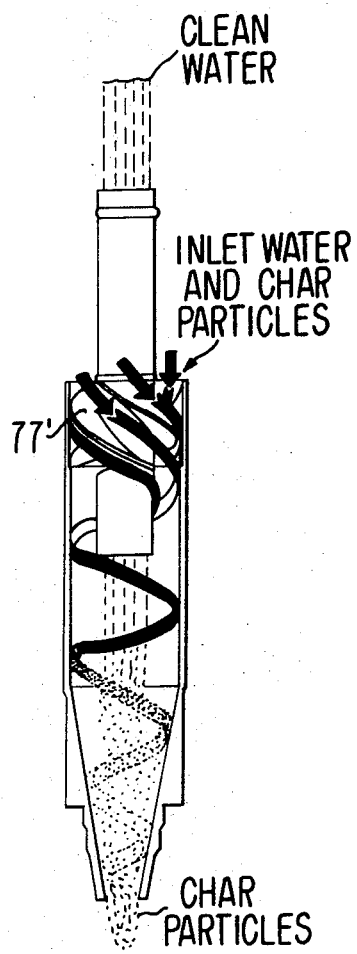
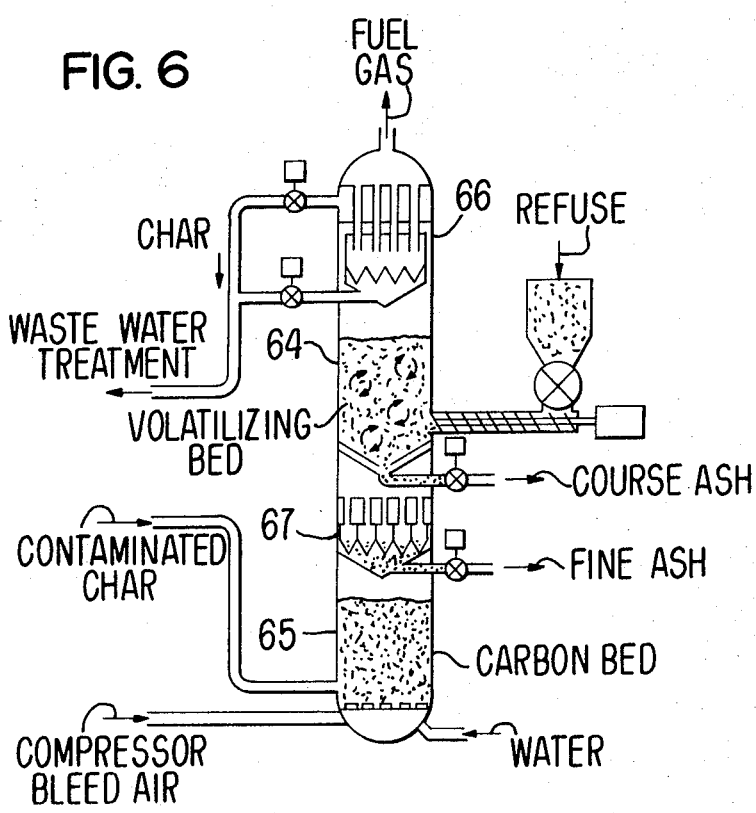

INVENTORS
DALE A. FURLONG
RICHARD D. SMITH

BY *Limbach and Limbach*
ATTORNEYS

United States Patent Office 3,741,890
Patented June 26, 1973

3,741,890
SOLID WASTE DISPOSAL AND WATER PURIFICATION METHOD AND APPARATUS
Richard D. Smith, Palo Alto, and Dale A. Furlong, Sunnyvale, Calif., assignors to Combustion Power Company, Inc., Palo Alto, Calif.
Filed Aug. 6, 1969, Ser. No. 847,994
Int. Cl. C02b 1/14; C02c 5/02
U.S. Cl. 210—40                                                13 Claims

ABSTRACT OF THE DISCLOSURE

A solid waste disposal and water purification system is described with a waste receiving, shredding, and drying assembly, a gas turbine assembly for combusting hot fuel gases, and a gasifier assembly for pyrolyzing the waste and producing hot fuel gas and active char. The active char is removed from the gasifier assembly and is mixed with incoming polluted water for purification. The contaminated char is removed from the water which is then lime clarified, filtered and, if desired, sterilized and distilled. The contaminated char is reactivated for reuse in water purification or consumed in the gasifier assembly.

---

The invention described herein was made in the course of, or under a contract with, the Department of Health, Education and Welfare.

The present invention relates to a solid waste disposal and water purification method and apparatus. There is disclosed in United States patent application Ser. No. 756,595, filed Aug. 30, 1968, now U.S. Pat. 3,589,313 in the names of Smith et al. entitled Solid Waste Disposal Method and Apparatus, and assigned to the same assignee as this present invention, a novel solid waste disposal system employing a gas turbine assembly fed by gas from a solid waste consumption stage which in turn receives compressed air from the compressor portion of the turbine assembly. In one version of this system, a gasifier assembly is used to provide hot fuel gas for a conventional gas turbine combustion chamber interposed between the compressor and turbine. Such a system is well suited for the purpose of treating solid wastes from a sizable community; however there remains the problem of treating and/or otherwise disposing of the waste water or sewage from the same source. Present water treatment systems in general lead to the pollution of our lakes, bays, rivers and streams, with the accompanying destruction of fish and game and the production of an odorous environment.

The disposal of solid waste (refuse) and the purification of waste water (sewage) is one of the most critical social problems today facing countries with large urban populations. A typical city with a population of 160,000 in the United States produces four hundred tons of refuse a day including food, hard goods, clothes and paper, an average of five pounds per person per day, and an average of 120 to 160 gallons per person per day of waste water.

Since matter is neither created nor destroyed, the majority of the material consumed by the city population is discharged from the city in the waste water or directly as solid waste. The city water supply is used literally to flush many of the wastes from the city. Waste waters are dilute solutions containing a wide variety of suspended solids, soluble organics, dissolved minerals, bacteria, and viruses. Solid wastes are largely paper, cellulose materials, and plastics; most of the food wastes are ground up in sink disposals and exit from the city as suspended solids and soluble organics in the waste water.

Incineration of solid wastes is widely accepted as the most desirable solution to one aspect of the problem but has not been universally adopted because of its high cost, particularly if the incinerator meets air pollution standards. Sanitary land fills do not pollute the air and are inexpensive, but sites adjacent to urban areas are filling up and suitable new sites are not generally available. As to water treatment, most of the waste water leaving the cities is inadequately treated to remove contaminants, and those contaminants are rapidly polluting our open fresh waters. The cost of secondary treatment of the sewage is staggering; for example, secondary treatment of the sewage of 80% of the U.S. population would be 20 billion dollars annually and even secondary treatment is now considered inadequate if our lakes, rivers and streams are to be returned to their natural condition.

In the above mentioned patent application, certain solid waste treatment systems are described which are suitable for disposing of the solid waste of urban areas. For the treatment of water, it is necessary that pollutants be removed from the water, including dissolved organics. In addition, in order to eliminate pollution of the streams, rivers and lakes, the waste water must be treated to remove phosphates and nitrogen before the water is discharged into those bodies of water. If the waste water is to be completely renovated for reuse as potable water, the mineral content must be reduced and the water must be completely free from harmful bacteria, viruses, and other disease carriers.

The object of the present invention is to provide a waste disposal and water treatment method and system wherein the energy to operate the system is derived from the solid waste itself, the active char by-product of the pyrolysis of the waste being utilized to adsorb contaminants from the waste water.

Active carbon which is produced with the waste disposal system of this invention can hold up to 30 to 40% of its weight in adsorbed contaminants. In addition, combined calcium oxide and magnesium oxide, or lime is a further chemical by-product of this waste disposal and can be utilized to remove suspended solids and the nutrient, phosphate, from the water. If nitrogen is also removed from the water, the water is then sufficiently purified to release into the streams and lakes. In the event it is desired to treat the water additionally to make it potable, a treatment stage can be added to the system wherein a portion of the soluble mineral salts are removed from the water and substantially all of the bacteria and virus are removed or killed.

In accordance with one aspect of the invention, the solid waste material is shredded and dried and then transmitted to a pyrolyzer where the waste is converted to hot fuel gas and char. The hot fuel gas is utilized to drive a gas turbine which generates all the power necessary to operate this complete waste disposal and water treatment system, excess power being used to generate electrical power for use or sale by the agency operating the disposal plant. Heat obtained from a portion of the exhaust gases from the gas turbine assembly is used in drying the incoming waste material, and a compressor driven by this gas turbine supplies compressed air to a char combustion chamber, char being supplied from the pyrolyzer to the chamber for combustion to provide the hot inert gases used to operate the pyrolyzer. A portion of the char is removed from the pyrolyzer and mixed with incoming waste water to remove contaminants therefrom by adsorption. After adsorption of contaminants, a large portion of the char is then removed from the water and recirculated back into the pyrolyzer.

In accordane with another aspect of this invention, water, partially decontaminated through adsorption by char generated in the waste disposal system, is clarified with lime taken from ash generated in the combustion of that very same char. Lime clarification serves to remove from the water the supra-colloidal and colloidal suspended solids, the colloidal size char particles and the phosphates. Calcium carbonate precipitated in the lime clarification can be returned to the pyrolyzer where it is recalcinated for reuse in further lime clarification.

In accordance with still another aspect of the present invention, heat and power generated in the waste disposal system can be utilized to distill and sterilize the partially treated waste water so that the water is fully renovated and suitable for domestic reuse by the very population that generates the solid and liquid waste.

These and other features and advantages will become more apparent upon a perusal of the following specification taken in conjunction with the accompanying drawings wherein similar characters of reference refer to similar structures in each of the several views and wherein:

FIG. 3 is a schematic diagram of a system of the type shown in block diagram form in FIG. 1;

FIG. 5 is a schematic drawing of another form of gasifier apparatus;

FIG. 6 is a schematic drawing of still another form of gasifier apparatus;

FIG. 7 is a schematic drawing of a typical inertial separator used in the system of FIG. 3 for the removal of char from treated water;

Figure 1:
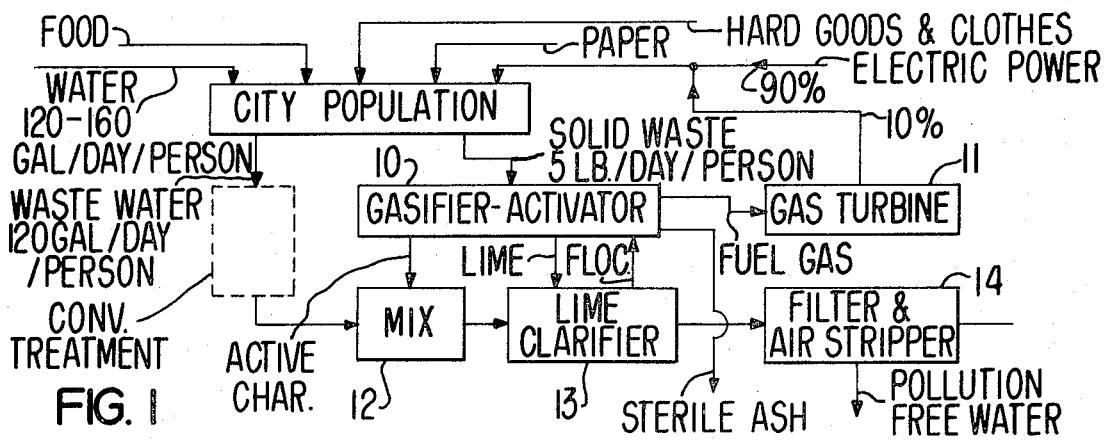
FIG. 1 is a block diagram of a waste disposal and water purification system of the type to which the present invention relates.

Referring now to FIG. 1, there is shown in block diagram form a waste disposal system of a city adapted to dispose of solid waste and purify waste water to the quality of the stream or river into which it is to be discharged. Purification is accomplished by an active carbon adsorption method in conjunction with a lime clarification method. The active carbon is made from the fixed carbon or char in the solid waste. Since the refuse is composed largely of paper and paper products, it contains approximately 7% fixed carbon or char. The lime for clarification is taken from the refuse ash which contains 12% combined calcium oxide and magnesium oxide, or lime.

The solid waste entering the system is pyrolzed (heated in the absence of air) in the gasifier-activator 10 to produce fuel gas and active char. Solid waste is a better fuel then generally imagined; it contains 5000 B.t.u./lb., one-third the heating value of the best grade of cool. The fuel gas is supplied to the gas turbine 11 for electric power generation while considerable amounts of waste heat can be made available for other uses. The active char, in powder form, is mixed with incoming waste water in mixer 12.

Lime dissolved from the ash of the combustion chamber of the gasifier 10 is fed to the lime clarifier 13, which removes the suspended solids, phosphates, and contaminated char from the effluent. These materials are all recovered in a floc which is returned with new solid waste to the gasifier 10 to pyrolyze contaminants on the char for recycle of the char and to calcine the lime for reuse. The heat from the burning char pyrolyzes the incoming refuse and calcines the lime. Sterile ash is discharged from the gasifier. The effluent leaving the clarifier 13 is passed through a filter and airstripper 14 (the latter to remove ammonia) before being discharged.

The above waste water purification methods to be described in greater detail below will remove essentially all pollution from waste water which has already been treated in a conventional primary and secondary plant. Such a system operating under optimum conditions will produce the same high quality affluent with raw sewage. eliminating the need for a conventional plant.

Municipal waste water carries contaminants as solids physically suspended in the water and as solids dissolved in the water. These solids may be either organic or mineral. In addition, bacteria and virus are carried in the waste water.

The concentration of contaminants in waste water is relatively low; 500 milligrams per liter or 0.05% by weight is typical. The size distribution of the contaminants in municipal waste water entering a treatment plant is as follows: settleable solids (greater than 100 microns), 71 mg./l. total solids of which 57 mg./l. are organics; supra-colloidal solids (100 microns to 1 micron), 55 mg./l. total solids of which 43 mg./l. are organics; colloidal solids (1 micron to 1 millimicron), 29 mg./l. total solids of which 22 mg./l. are organics; and soluble solids (less than 1 millimicron), 352 mg./l. total solids of which 127 mg./l. are organics. It can be seen from the above figures that a large portion of the contaminants are organic, with a large portion of those being dissolved.

The chemical composition of the mineral constituents are: nitrogen compounds, phosphorus compounds, metal salts such as sodium chloride, and other materials as may be obtained from industrial wastes.

Viruses are introduced into the waste water by human and animal feces. Typical densities of enteric viruses in sewage average about 7000 viruses per liter of raw untreated sewage.

If municipal waste water were discharged directly into a lake or stream, the organic content would encourage the rapid growth of bacteria. These bacteria, when they had multiplied sufficiently, would consume the dissolved oxygen in the water, killing animal life. Nitrogen compounds and phosphorous compounds act as nutrients to algae and other aquatic plants causing excessive growths of these organisms. Decomposition of the plants contributes organic matter which then depletes the dissolved oxygen in the water below the levels necessary for other aquatic life.

Infectious hepatitis and poliomyelitis viruses have been isolated from well and river water. Enteroviruses have caused major problems in swimming pools and along beaches in this country.

Conventional waste water treatments are classified as primary and secondary; many of the larger cities have both primary and secondary treatment facilities, however, much of our total population's sewage is discharged with only primary treatment, or less.

The objective of primary treatment has been to reduce the amount of oxygen-demanding materials in the water along with the reduction of suspended solids and bacteria. The raw sewage is first passed through coarse screening to remove large objects that would injure the pumps and would not be consumed by the treatment. Next, the sewage passes through a degritting chamber where sand, dirt, and other mineral grit is removed. The sewage next passes into a large primary tank or settling tank. Light contaminants such as grease and fats rise to the surface and are removed as skimmings. The settleable solids sink to the bottom of the tank and are removed as primary sludge, requiring disposal. The effluent leaving the tank is called the primary effluent.

Whereas, primary treatment removes contaminants from the waste water by only physical separation, secondary treatment removes contaminants by biological oxidation. The primary effluent is pumped into a large tank where air is bubbled through the waste water for up to six hours. This causes growth of aerobic bacteria and other organisms which use the organics in the waste water for food. After aeration, the waste water may be passed to a clarifier where the expended bacteria cells form a sludge and settle to the bottom of the tank. The biological sludge or cultivated sludge is disposed of and the secondary effluent is discharged.

Refined measurements at a typical treatment plant have shown that with a total plant influent of 507 mg./l. of solids of which 249 mg./l. were organics, the plant effluent contained 317 mg./l. of solids of which 90 mg./l. were organics. Thus, only about one-third of the total waste solids are removed, primarily due to the fact that there is little reduction in dissolved solids.

Electron micrographs indicate that bacterial flocs represent the bulk of supra-colloidal matter leaving in the effluent of a conventional plant. These micrographs also indicated that the colloidal fraction is comprised of individual bacterial cells and cell wall debris, with lesser amounts of phages, viruses, detached flagella, and other solids. These are the remains of the bacteria from the secondary treatment. Because of their cellular qualities, they are slimy, tending to clog filters and the semi-permeable membranes of reverse osmosis equipment.

In addition to the supra-colloidal and dissolved organics in the secondary effluent, the large quantity of dissolved inorganic solids contain nitrogen and phosphorus compounds, now recognized as nutrients for algae and aquatic plants. Nitrogen is primarily in the form of ammonia or nitrate, with minor amounts of nitrite. Besides its problem as a nutrient, nitrate at high concentrations in drinking water can cause methemoglobinemia in infants. Phosphorous occurs largely as the orthophosphate ion.

The water treatment system outlined above and described in greater detail below in conjunction with a description of the solid waste disposal plant is especially suitable for the purification of municipal waste water.

Figure 2:
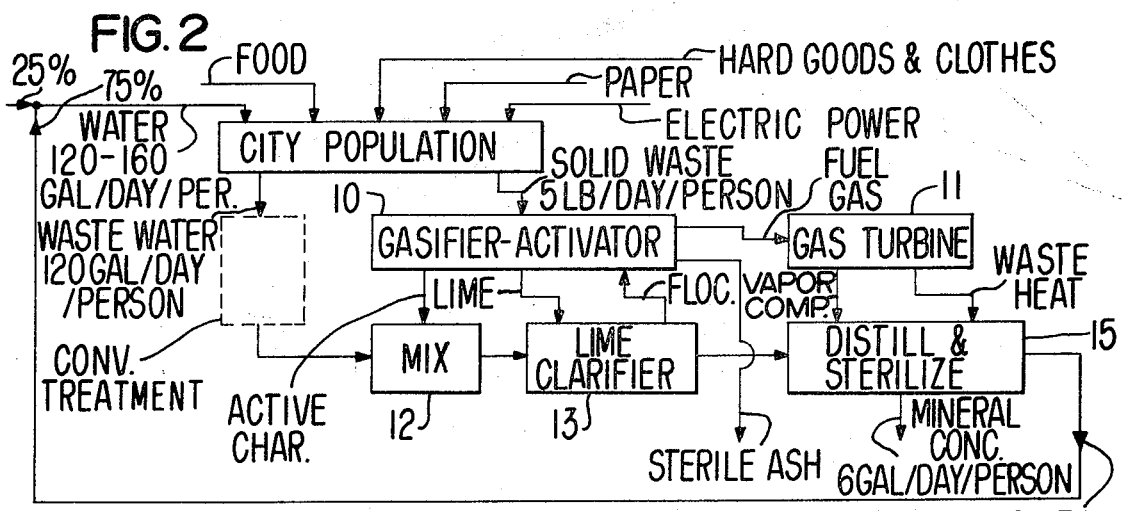
FIG. 2 is a block diagram of still another waste disposal and water purification system embodying the present invention wherein the water is purified to the point of domestic reuseability.

FIG. 2 discloses a system similar to that of FIG. 1 except the water is purified for domestic reuse. As in the system of FIG. 1, the solid waste is pyrolyzed into a fuel gas and char; the char is mixed with the waste water to adsorb contaminants, and removed with the contaminants attached. It is subsequently burned to a sterile ash, supplying heat to the pyrolyzer.

Actual renovation of waste water to potable water requires that the mineral content be reduced and that the pathogenic organisms be killed or rendered harmless. Treatment by active carbon adsorption does not remove minerals but will remove certain bacteria and viruses. A distillation and sterilization stage 15 removes minerals and kills harmful microorganisms. The turbine 11 is used to drive the vapor compressor in the distillation system.

Appoximately half of the purified water is distilled to remove the mineral content. The portion of the water not distilled is heated to 230° F. by waste heat to sterilize it. The minerals are removed as a concentrated solution with approximately 6 gal./day/person being produced.

Renovated water is recirculated back into the city water supply and provides as much as 75% of the water needs, depending upon evaporation losses in the cycle. This system can derive income from the sale of potable water to partially offset operating costs.

Referring now to FIG. 3, there is shown one illustrative embodiment of the present invention. As schematically illustrated, the method and apparatus of the present invention are practiced utilizing a waste receiving, shredding and drying assembly 16, a gasifier-activator assembly 10, a compressor-turbine assembly 11, an electric generator assembly 17, an activated carbon water treatment assembly 12, a lime clarifier assembly 13, and a filter and air-stripping assembly 14.

The solid wastes are typically received from municipal collection trucks 20 which dump the waste into the receiving and storage section 21 of assembly 16 which includes a circular turntable or carousel floating on a pond of water within a hollow cylindrical housing and with the carousel rotatable to feed the solid wastes into a shredding section 22.

In the shredding section 22, all of the solid wastes are shredded to form a more nearly homogeneous shredded material which is easily transported through the remainder of the system by conventional automated devices for materials handling.

The shredded solid wastes are dried in a drying section 23 to increase the burning rate of waste in the overall system and eliminate the variability in burning rate resulting from widely different moisture contents. A rapid and uniform burning rate promotes clean combustion and reduces the required size of the combustion chamber.

The heat utilized in the drying section 23 is provided by a heated air stream 24 which obtains its heat from a portion of the exhaust gases 25 from the gas turbine assembly 11.

The compressor-turbine assembly 11 draws at least a portion of its compressor intake air 27 through a filter 28 from the air space above the waste in the receiving and storing, shredding and drying sections 21, 22, and 23, respectively, to prevent dust and odors from escaping to the environment. All of the malodorous gases carried on into the compressor portion 29 of the gas turbine assembly 11 are subsequently subjected to elevated temperatures and sterilization before release. The shredded and dried solid waste is transported via a conduit 30 and fed into the high pressure environment of the gasifier-activator assembly 10 such as by a rotary feeder 32. The speed of the rotary feeder is adjusted by a control system to maintain proper temperature and gas flow within the assembly 10.

In the compression portion 29 thereof the compressor-turbine assembly 11 compresses the intake air 27 from the assembly 16 and from the outside environment to elevated pressures and temperatures. This hot high pressure air is ducted via conduit 33 to the gasifier-activator assembly 10 to provide the oxygen for combustion in the combustion chamber.

The combustion of hydrocarbon materials occurs in three distinct phases. In the first phase, called pyrolysis or volatilization, the material is heated, causing decomposition of the hydrocarbon solids into hydrocarbon gases. Next, these gases are oxidized in a gas phase reaction. Finally, the solid carbonaceous char remaining after volatilization is oxidized. These three processes occur almost independently in all combustion processes.

Figure 4:
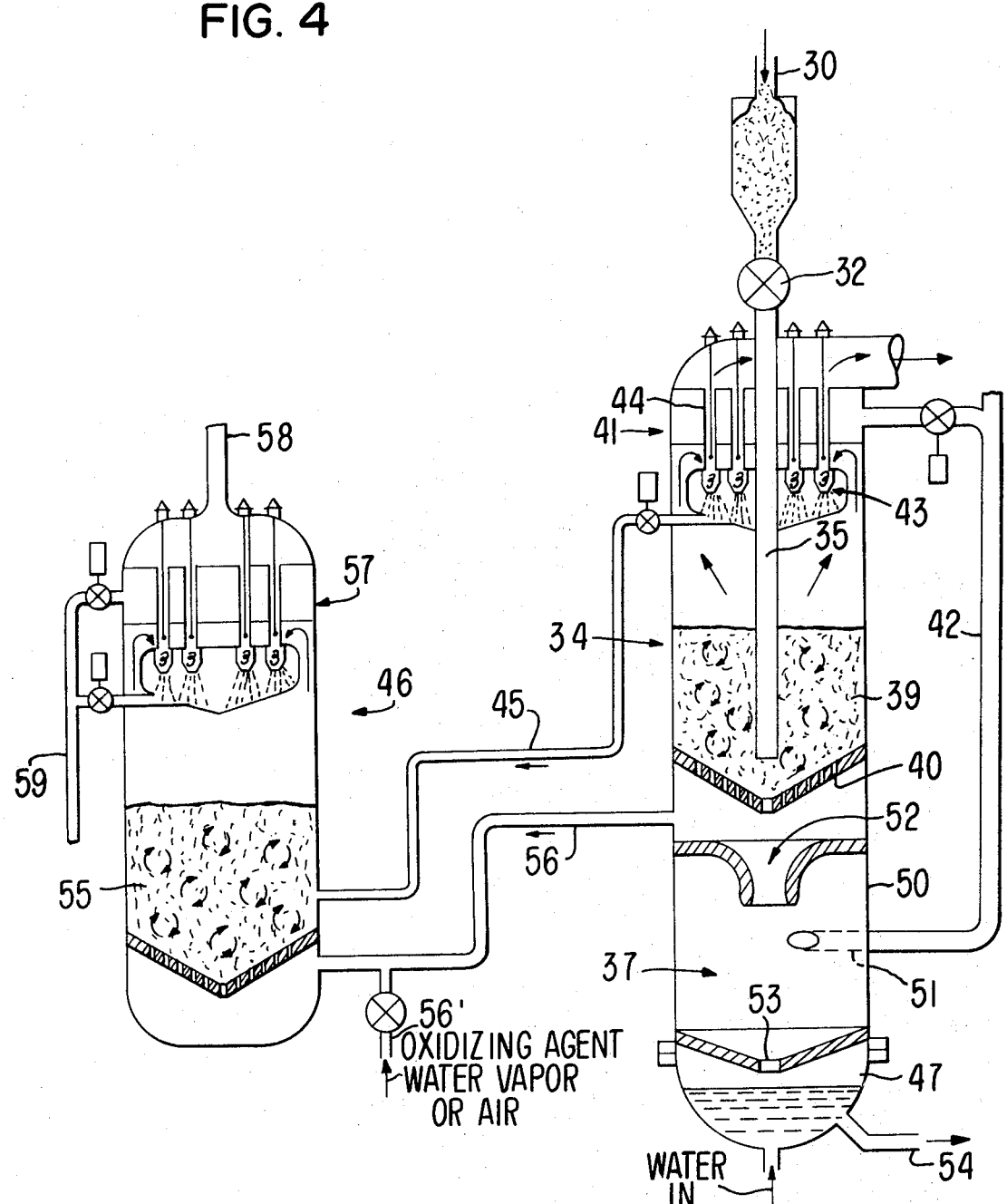
FIG. 4 is a schematic drawing of one form of gasifier-activator apparatus used in the system of FIG. 3.

In the gasifier utilized in the present invention, as specifically shown in FIG. 4, each phase occurs in a separarate location. Shredded and dried solid waste material is first injected from a conduit 35 into a pyrolyzer or pyrolyzing chamber 34 where the first phase pyrolysis or volatilization takes place. The combustible hydrocarbon gases generated in the pyrolyzing chamber 34 serve as a gaseous fuel for the gas turbine 11 where gas phase oxidation occurs in the gas turbine combustors 36. Heat necessary to pyrolyze the solid wastes is derived from heat exchange with hot inert gases. These hot inert gases (over 3000 F.) are separately generated in a char combustion chamber 37 which, for the third phase, oxidizes residual solid char coming from the pyrolyzer with air bled from the compressor portion 29 of the gas turbine assembly 11. The bleed air that is directed into the char combustion chamber 37 from the gas turbine compressor is compressed in a supercharger 38 (approximately 5% of the gas turbine flow rate) to account for pressure losses in both the char combustion chamber 37 and the pyrolyzing chamber 34.

The particular pyrolyzer 34 illustrated includes a fluid bed reactor of sand or other inert particles 39 supported on a downwardly directed conical, porous injector plate 49 apertured at the conical apex. The inert particles are suspended or fluidized during operation by passing hot inert gas therethrough. Limestone or dolomite can be added to the particle bed for control of noxious gases. Abrasion by the fluid bed will rapidly remove char as it is formed on the surface of waste material and this fine char material thus abraded will be carried out of the fluid bed by gases and subsequently separated by particle collectors 41. This bed of particles 39 is initially heated by an external source (not shown) to an elevated temperature for pyrolysis of waste material and pyrolysis is maintained with the compressed hot gases from the char combustion chamber 37 passing through grate 40. The air to supply the char combustor 37 comes from the compressor turbine assembly 11 through conduit 42.

The primary constituent of the organic fraction of the solid waste material is cellulose, the chief component of all wood and plant fibers, and hence of all paper products. In the fluid bed 39 in the pyrolyzing chamber 34, degradation of the cellulose material will occur and eventually all the oxygen and hydrogen, and a substantial part of the carbon, will be driven off leaving a carbonaceous char and non-combustible ingredients such as metal and glass. Most of the carbon driven off is in the form of fine particles produced by the abrading action of the particle bed. Oxidation of this fixed carbon particulate in the pyrolyzer 34 could not be accomplished without burning some of the fuel gases. This char particulate is removed from the pyrolyzer and either returned via the conduit 42 to the char combustor 37 where it is burned at near stoichiometric fuel air ratios for generation of the inert gases for the pyrolyzer 34 or sent to an activator as subsequently described. In the event that insufficient fixed carbon or char is available to provide the required heat for pyrolysis of the incoming refuse, fuel gas may be bypassed from the gasifier exit and burned in the char combustor 37.

The particle collectors 41 are a combination of inertial separators 43 followed by electrostatic precipitators 44 or mat filters (not shown). The inertial separators 43 remove all but the smallest particles, and these small particles are removed by the electrostatic precipitators 44 or a mat filter (not shown) before the hot gases are sent to the turbine 11. In one embodiment of this invention, the inertial separators are designed to allow char particles of less than 30 microns to pass into the conduit 42 to the combustion chamber 37 while diverting char particles of 30 microns and larger through conduit 45 into an activator 46.

In the pyrolyzer large pieces of solid waste that are not buoyed up by the fluid bed 39 migrate to the apex of the conical injector 40. There, these pieces are continuously exposed to the entering 3000° F. gas stream from the combustor 37 and rapidly are either pyrolyzed or melted. If melted, the molten residue drips directly into a quench tank 47 through the core of the char combustor chamber 37.

An integrated gasifier in accordance with this construction approximately 4 feet in diameter and 20 feet high will process 200 tons of solid waste material in 24 hours. Two or more may be used as desired.

The high temperature of the fuel gas going from the pyrolyzer 34 to the gas turbine combustors 36 will assist rapid, complete combustion, and since only this high temperature gaseous fuel is combusted, it becomes unnecessary to use a high core temperature combustor thereby avoiding generation of the usual nitrogen oxides and promoting uniform temperature profile in the combustor.

The char combustor 37 is a vortex combustor consisting of a cylindrical housing 50 with a ceramic lining and into which compressor air with entrained fine char particles recovered from the pyrolyzer gases by the particle collectors 41 is introduced tangentially via a conduit 51 at high velocity such as 300 feet per second causing gases in the combustor chamber 37 to flow in free vortex motion. Centrifugal force causes solid particles entrained in the vortex to migrate toward the walls and continue to rotate until consumed or slowed by contact with the walls while he inert gases increase in angular velocity and are removed from the core of the vortex and pass through a re-entrant throat section 52 after which their angular velocity is reduced and they pass through the ceramic injector plate 40 into the fluid bed pyrolyzer 34. Since the temperature in the combustor is above 3000° F., the ash and metals are melted and these molten droplets collect on the wall of the chamber. Larger particles stick to the molten ash and are exposed to a relatively high velocity air stream promoting rapid combustion. The liquid ash and metal subsequently drain through a hole 53 in the bottom of the char combustor 37 into the quench tank 47. There the molten residue is suddenly quenched in water resulting in the formation of granular residue which is removed as a water slurry via conduit 54.

Of the larger char particles from the pyrolyzer chamber diverted into the char activator 46, some char will already be activated. Substantially all of the char directed to the activator which is not yet activated is there activated by driving off hydrocarbons and selectively oxidizing the surface of the char.

The activator 46 uses an inert fluid bed of sand or similar material 55 maintained at the desired activation temperature (1200° F. to 1800° F.) by hot fluidizing gas. The hot gas is taken via conduit 56 from the combustion chamber 52 that supplies the hot gas for the fluid bed of the pyrolyzer; that gas contains primarily carbon dioxide and nitrogen at 3000° F. The gas heats the inert particles of the bed 55, which in turn supply the heat to the char particles to drive the endothermic activation process. Activation is rapid because the heat transfer from the fluid bed to the char is ten times greater than it would be if the heat were transferred directly from a hot gas to the char.

The composition of the hot gas from the combustion chamber 52 can be altered by the addition of water vapor or air via conduit 56', if desired, to provide the proper oxidizing atmosphere for the activation process.

The char particles from the pyrolyzer are introduced near the bottom of the bed 55. After passing through the bed 55 they are elutriated and collected in the particle collector 57 ready for use with waste water. Some reduction in size results from bed abrasion as the particles pass through the fluid bed 55.

Hot gases from the activator 46 contain hydrocarbon fuel gases and carbon monoxide. These gases are introduced into the burners of the gas turbine 11 via conduit 58, and the activated char is delivered via conduit 59 to a storage tank 60.

In some instances of use, conditions in the pyrolyzer can be adjusted so that the pyrolyzer provides active char directly and certain ones or all activators may be eliminated.

The hot gases leaving the particle collectors 41 and 57 are, after combustion in the gas turbine and mixing with the remaining 95% of the air flow, expanded through the expansion and drive portion 36 of the compressor-turbine assembly 11 which drives the compressor portion 29 of the assembly 11, and drives the electric generator assembly 17 to produce electric power. The hot gas leaving the compressor turbine assembly 11 is near atmospheric pressure but at elevated temperature so that a portion 25 can be utilized for drying shredded solid waste material in the drying assembly 16 as described above. An optional exhaust heat recovery system 201 can be provided in the exhaust line from the gas turbine for utilization of the heat for producing electric power to operate the plant or for sale. The exhaust heat boiler 61 supplies steam to a turbine 202 connected to an electric generator 203. A condensor 204 condenses steam downstream of the turbine and returns water to the boiler.

In the modern field of power generating equipment, the gas turbine is most suited for the capacity range of 5 to 30 megawatts, above diesel and gas engine generators for lower powers and below steam turbine generators for higher powers. The present system is specifically designed for providing as an advanced incinerator a compact module consuming between 200 and 800 tons per day of solid waste and generating through an electric generator between 7 megawatts and 30 megawatts of electric power.

A 400 ton per day unit utilizing a 15 megawatt capacity gas turbine will dispose of solid wastes from approximately 150,000 people; for their entire population San Francisco would require 5 units of this size, New York would require 40 units. Such a unit will dispose of solid waste for 95¢ per ton, approximately one-half the cost of sanitary land fill and 16% of the cost of modern conventional incinerators. Additionally, such a unit can supply 5 to 10% of the electric power requirements of the community serviced by the incinerator.

The waste water influent into the solid waste disposal and water purification plant may be directly from a sewer as raw sewage, from a primary treatment plant where the larger particles have already been removed, or from a primary and secondary plant. Assuming it comes as raw sewage, it enters this plant via conduit 70 and into a primary screener 71. This screener is a high flow device capable of removing all suspended or floating solids larger than 1/16 inch. The screened out solids are drained, then directly transported into the carousel 21, where they are added to the solid waste material and typically represent less than 1% of the solid waste.

Although a primary settling tank could be used, primary screening is preferred because the screen is highly compact compared to a large primary settling tank. The efficiency of a screen depends upon the fineness of the openings, the velocity of the water through the openings, and the physical characteristics of the solids in the water when it reaches the screen.

The revolving disc screen 72 is mounted on an axis inclined 10° to 25° from the vertical, such that only the lower part of the screen is submerged in the water. As the screen revolves, the screened-out solids are raised above the water. The solids collecting on the screen 72 are continuously removed. Such removal is effected by scraping and a stream of water or air backwash or steam backwash. The screen can consist of stainless steel woven cloth as fine as 60 mesh, perforated plates with holes as small as .044 inch, or a wedge-slot design fabricated of parallel thin bars set in slots in a series of U-bars. Standard slot openings range from .01 inch to .25 inch. If desired, a conventional form of drum-type screen may be utilized to do the initial filtering in lieu of the disk-type.

The screened waste water flows via conduit 73 to first and second stage carbon contact tanks 74 and 75, respectively, where powdered active char is mixed by agitators 76 with the waste water to remove the soluble organics. The powdered char initially introduced in tank 75 from storage tank 60 is removed from the effluent of the second stage mixing tank 75 by an inertial separator 77 and recirculated back via conduit 78 to the first stage tank 74. Approximately 400 mg./liter of powdered active char is added to the waste water from inertial separator 77 as it enters the first stage mixing tank 74.

In the first stage tank 74 the slightly used char is thoroughly mixed with the incoming waste water for maximum contact; in an illustrative example retention time in the first stage tank being approximately 15 minutes.

The effluent from the first stage is passed through a high efficiency inertial separator 79 where a large portion of the active carbon, which has adsorbed 35% of its weight in soluble organic, is removed from the stream. The powdered active carbon introduced into and removed from the first stage is approximately 30 microns or larger in diameter. The separator 79 downstream of the first stage tank 74 which removes the majority of the carbon also removes a large portion of the settleable solids which escaped the primary screen 71. The contaminated char and removed settleable solids are piped via conduit 80 to the centrifuge 81 where they are separated out as dewatered sludge and transmitted to the dryer 23.

The effluent from the inertial separator 79 is introduced into the second stage carbon contact tank 75 where approximately 400 mg./liter or more of fresh active char made from refuse is introduced from storage tank 60 and mixed with the partially cleaned waste water. While the majority of the active char will be 30 microns or greater, some material will be much finer than this. Residence time in the second stage tank is also approximately 15 minutes; at this point almost all of the soluble organics have been adsorbed on the active carbon.

Upon leaving the second stage tank 75, the inertial separator 77 removes the particles of carbon 30 microns and above and circulates them back to the first stage tank 74. The very fine carbon particles remain with the water. The partially cleaned waste water, containing its original contaminant load of supra-colloidal solids and colloidal solids, as well as active carbon in that size range, is pumped to the lime clarifier 13 via conduit 82.

A typical form of inertial separator used to remove the 30 microns and greater char particles downstream of the mixing tanks include many small 1-inch diameter inertial separator tubes, one of which is shown schematically in FIG. 7. The water and char particles are spun by the inlet guide vanes 77'; the carbon, having twice the specific gravity of water, is forced to the outside wall, decelerates and is removed from the bottom with perhaps 1% or less of the total flow. The clean water exits from the center of the tube.

The lime clarifier 13 acts to remove the supra-colloidal and colloidal suspended solids, the colloidal size active carbon particles, and the phosphates. Lime, taken from the ash of refuse, is added via conduit 83 to the lime clarifier 13 as a concentrated solution by means of the inertial separator 84 fed by the water slurry from the quench tanks 47. In the lime clarifier, a floc is generated which traps the fine particles and holds them in a sludge which settles and is removed via conduit 85 to the centrifuge 91 for dewatering. The water in the lime clarifier has a pH of at least 9.5; at that pH the orthophosphate in the partially cleaned waste water combines with the calcium, precipitating out as insoluble hydroxyapatite crystals. Those crystals are trapped in the floc and removed with the sludge from the clarifier.

Calcium bicarbonate, one mineral causing hardness of water, is converted to calcium carbonate in the lime clarifier. Calcium carbonate is insoluble and precipitates out, also being removed in the floc. Consequently, the lime clarifier acts as a water softener.

The chemical clarification utilized includes a coagulation step, a flocculation step, a sedimentation step, and a filtration step. Coagulation or destabilization of colloidal suspensions is achieved by addition of chemicals which are rapidly mixed with the water. The formation of small floc particles results. Further slow stirring allows floc particle size to increase by agglomeration in the flocculation step. The floc is at least partly composed of a hydrous oxide that has a slight positive charge. Metals whose oxides are involved are aluminum, iron, or, in the case of lime treatment, magnesium. The floc particles have ability to aggregate colloidal particles and adsorb or entrap them. There is a lowering of the usually negative zeta potential of the colloidal particles that would tend to destabilize colloidal dispersion. There is also an attraction between the slightly negatively charged colloid particles and the slightly positive floc particles. The result, when proper chemical doses are used, is a very effective tying-up of suspended solids into floc particles, most of which are large enough to settle well.

The lime clarification 13 of the system shown in FIG. 3 acts to remove inorganic and organic suspended solids in the colloidal range, to remove fine active carbon particles, to remove orthophosphate and to release its effluent at a high enough pH for air stripping of ammonia.

Clarifier 13 comprises a single stage internal recirculating clarifier, although two or more stages can be employed if desired. The clarifier tank 86 is divided by means of vanes into several zones, including a recirculation zone 87 having a water propeller means 88 located therein such that the incoming water from conduit 82 is contacted with the sludge formed in the sedimentation zone 89, thus promoting growth of the precipitating particles by solids-contact. Water leaving the recirculating zone 87 is forced upward through a "sludge blanket" in the outer zone 90 where particle size continues to grow and water upward velocity reduces. Water velocity at the surface is normally in the order of one gallon per minute per square foot in a clarifier diameter of approximately 130 feet.

Most solids settle out in the recirculation zone 87 and drop into the sedimentation zone 89, others are carried up with the water in the outer compartment 90 forming the sludge blanket.

This blanket helps trap small particles and allows them to agglomerate to settleable size. Sludge is removed from the clarifier as a 1 to 2 percent slurry via conduit 85 to the centrifuge 81.

The quantity of lime added to the lime clarifier is determined by that required to achieve a pH of 9.5 or greater for a single stage clarifier. A two stage clarifier will require added lime to achieve a pH of 11 or greater. In either case the quantity of lime required is determined by the pH of the influent and its hardness. For example, an addition of 227 mg./l. of lime will reduce the phosphate content of typical secondary effluent from 29 mg./l. to 0.5 mg./l.

The concentration of lime added to the waste water can be greatly in excess of 300 mg./l. if required due to the fact that the calcium carbonate precipitated in the lime clarifier is sent through the centrifuge 81 and is recalcined and recycled into the clarifier 13. New lime is added each cycle to make up for that lime chemically combined with the phosphates into calcium hydroxyapatite and to make up for any losses. The lime recirculation cycle is dependent upon having hard water, i.e. a population of the $HCO_3$ ion in the influent, which is normally the case rather than the exception. The average mineral concentration of influent to treatment plants contains 296 mg./l. of bicarbonate, and would increase 100 mg./l. in each reuse cycle.

Make up lime is contained in the ash of the refuse burned in the combustion chamber 37 of the gasifier 10. A typical composition contains 10.03% calcium oxide and 2.47% magnesium oxide; 12.5% in total.

Many of the constituents of the ash are insoluble (or nearly so) inerts and can be removed easily by physical separation; these are $SiO_2$, $Al_2O_3$, $Fe_2O_3$, $TiO_2$, ZnO, and BaO. The $Na_2O$ and the $K_2O$ will hydrolize to NaOH and KOH, providing hydroxide ions, increasing the pH and increasing the precipitation of calcium carbonate. The added OH produced by the $Na_2O$ has the effect of increasing the lime concentration by 1.64%, to 14.1% from 12.5%.

The $P_2O_5$ in the ash is undesirable because when dissolved in the water it decomposes to $H_3PO_4$, phosphoric acid, which ionizes to produce the unwanted phosphate ion. This phosphate ion may be directly reacted with the calcium oxide in the ash prior to the introduction of the mixture to the lime clarifier. The product, the insoluble calcium hydroxylapatite, is simply carried through the process. Reaction of the $P_2O_5$ removes 2.7% of the lime of the ash, hence reducing its effective concentration from 14.1% to 11.4%, compared to 12.5% originally.

The net effect of this is that 71 mg./l. of make up lime are available for each cycle. This make up will be greater than the 25 mg./l. of lime needed to react with the phosphorus, hence the lime concentration can be increased to most any value required. Excess lime is not desirable, however, as it causes excess amounts of acid for neutralization of the high pH before the effluent can be discharged from the plant.

The 1 or 2 percent solids sludge coming from the clarifier 13 is concentrated to an estimated value of 50 percent solids by the centrifuge 81 or by a vacuum filter. Lack of the biological floc normally present in activated sludges and the presence of large quantities of porous carbon particles make this dewatering operation much more rapid and thorough than current sludge dewatering processes.

The quality of the water coming from the lime clarifier 13 is further improved by filtration in beds of porous media such as sand or coal located in one or more filter tanks 91. A combination of straining, sedimentation, and further flocculation in the filter 91 contributes to removal of most of the floc remaining after the sedimentation step. In the sand filter much of the removal is by straining at the sand surface. As the floc layer builds up, pressure drop over the filter 91 increases. When the pressure drop reaches a predetermined value, feed-water flow is stopped and clear water is passed backward through the filter at a high enough rate to fluidize the sand and remove the collected floc. When a larger size sand is used, the floc penetrates some distance into the filter, the pressure-drop build-up is slowed and run-lengths increased. Filters may be made of two or more layers with each layer having a smaller particle size than the one above, and with the top layer of sufficient particle size that little straining occurs, and such filters are called multi-media filters.

Ammonia is removed from the waste water since ammonia contains most of the nitrogen that could serve as an algae nutrient if not removed. The high pH of the lime treated waste water assures that most of the normally present ammonium ($NH_4^+$) ion will have been converted to ammonia gas. Since ammonia is volatile, it can be removed by contacting the water with air.

Air-stripping of ammonia is accomplished in a cooling tower 92 supplied with a blower fan 93 for driving air over the water. Removal to 1 mg./l., or slightly over 95 percent average, requires a pH of 11 or higher at an air-to-liquid ratio of 350 ft.$^3$/gal. and a tower height of over 20 ft. The cooling tower air is ducted into the gas turbine inlet to prevent escape of the ammonia gas into the atmosphere and to provide cooling of the gas turbine inlet air. Since 350 ft.$^3$/gal. represents an air flow rate significantly greater than that required by the gas turbine, all the stripped gases is not ingested into the turbine.

Acid, for example sulfuric, is injected into the bottom of the air-stripping tower 92 to neutralize the high pH water prior to release to the receiving stream.

An alternate method of simultaneous ammonia stripping and pH reduction is to use the gas turbine exhaust as the stripping agent. The exhaust contains more than enough $CO_2$ to neutralize the high pH provided suitable mixing is provided.

Instead of the gasifier of pyrolyzer shown in FIG. 4, a simple gravity feed gasifier schematically illustrated in FIG. 5 can be utilized. In this construction, solid wastes are introduced at the top of a volatilizing chamber 62 and fed by gravity as they are volatilized and partially burned to ash, which is removed continuously from the bottom. Air is directed up through the gasifier after being introduced into the ash region and the air velocities are low to preclude agitation of the pyrolyzing products. After passing through the ash, the air reaches the carbon combustion zone 63 where the carbon is combined with a limited supply of oxygen to form carbon monoxide. Water is also introduced and the resultant steam and hot carbon result in the "producer gas" reaction which yields hydrogen and carbon monoxide and absorbs heat. The flow rates of water and air are controlled such that all the carbon is consumed, while assuring that slagging temperatures are not reached. The hot gases rising from the carbon combustion zone furnish heat to pyrolyze or volatilize the incoming solid waste, thereby generating the fuel gas which is ducted into the gas turbine combustors for final combustion with the primary air flow coming from the turbine compressor. Fixed carbon, partially oxidized, is removed from the base of the carbon combustion zone.

Another gasifier or pyrolyzing apparatus is schematically illustrated in FIG. 6 and consists of a dual fluid bed gasifier. In the dual bed the oxygen necessary to combust the carbon is separated from the initial pyrolysis process. Solid wastes are introduced into the upper or volatilizing fluid bed 64 where they are pyrolyzed by hot inert gases coming from the carbon combustion fluid bed 65. Rapid uniform pyrolysis is assured by the highly stirred conditions existing in the fluid bed 64. The fuel gas resulting from the pyrolysis passes through particle collectors 66 on its way to the gas turbine combustor. The particles collected contain both ash and carbonaceous char generated by the pyrolysis process. The char, after being used in the waste water treatment process, is burned by introducing the particles into the second or carbon combustion fluid bed. The fine ash is separated from the hot gas leaving the second bed by a second set of particle collectors 67. Ash slagging temperatures are prevented in the carbon bed by limiting the available oxygen and by introducing water or steam. The second fluid bed is made of a larger diameter than the upper bed to assure the lower superficial gas velocities required for combustion of the fine carbonaceous char.

Figure 8:
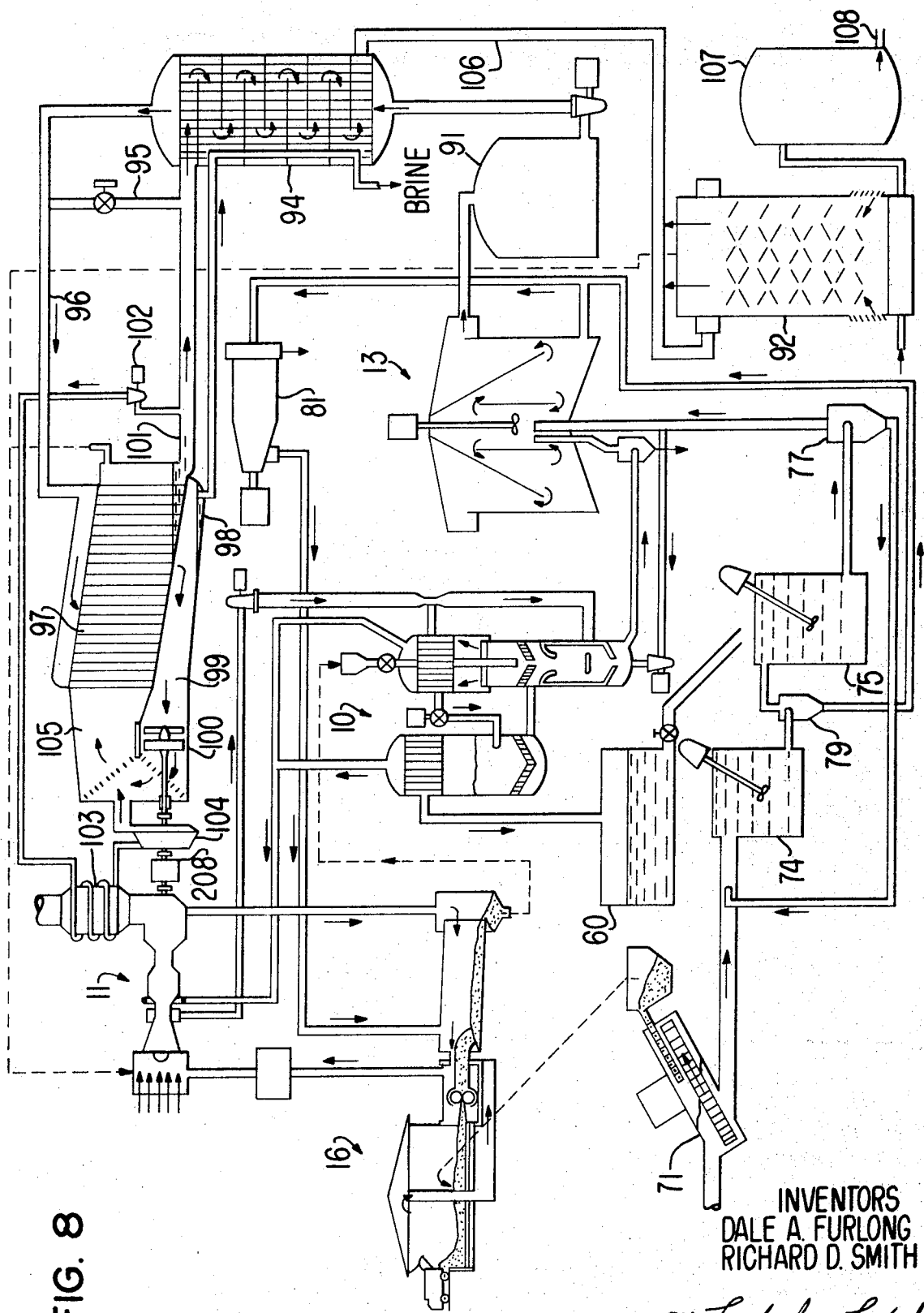
FIG. 8 is a schematic diagram of a system of the type shown in block diagram form in FIG. 2.

Referring now to FIG. 8, there is shown another embodiment of the present invention which is similar to the system described above except that the waste water is fully renovated and suitable for domestic reuse. To accomplish this, the water must have a portion of the soluble mineral salts removed (to prohibit build-up in the reuse cycle) and must have substantially all of the bacterial and virus removed or killed.

The domestic water reuse cycle adds various inorganic or mineral substances to the water; an estimate of the average magnitudes of the typical mineral concentrations found in waste water and the addition to these concentrations by one use cycle is as follows:

AVERAGE MINERAL COMPOSITION OF WASTE WATER

| Mineral | Average concentration, mg./l. | Increase during one use cycle |
| --- | --- | --- |
| Sodium | 124 | 66 |
| Calcium | **66 | 18 |
| Magnesium | **19 | 6 |
| Potassium | 12 | 10 |
| Ammonia | **20 | 20 |
| Chloride | 143 | 74 |
| Bicarbonate | **296 | 100 |
| Sulfate | 84 | 28 |
| Silicate | 43 | 15 |
| Phosphate | **25 | 24 |
| Total dissolved solids | 703 | 320 |

It is noted that almost half of the dissolved mineral concentrate is added with each reuse. At least this concentration of minerals must be removed to prevent build-up with repeated uses. The lime clarification process described above removes a portion of the soluble minerals, those noted with a double asterisk in the above table. Some minerals are also added in the treatment, notably sodium ions and sulfate ions.

Several advanced mineral removal processes, particularly electrodialysis or reverse osmosis, may be used with the above described system to meet the requirements for domestic reuse. Addition of either an electrodialysis or reverse osmosis inorganic removal process is straightforward, indeed, the improved organic removal of this system with respect to current biological oxidation processes will minimize the organic membrane clogging problems.

A third inorganic removal technique is distillation. Although distillation is a well known method of producing pure water from sea water, the following problems of distilling waste water exist:

(1) Distillation is more expensive than other techniques because of the cost of the heat required for the distillation process.
(2) Variable contaminants in the waste water, such as ammonia, are carried over as vapors and not removed by distillation. Distillation of secondary effluent may actually increase the odor level of the water. This would suggest pyrolysis of the existing organics and subsequent carry-over.
(3) Distillation of secondary effluent produces rapid organic fouling of the heat transfer surfaces.

The integration of a distillation process for mineral removal with the system of FIG. 3 offers solutions to each of the problems listed. These are:

(1) This system generates large quantities of heat and power from the combustion of solid waste which makes the costs of distillation competitive with other mineral removal processes.
(2) Volatile carry-over of ammonia into the product water can be removed by air stripping after distillation.
(3) Organic removal by the carbon adsorption-clarification-filtration minimizes organic fouling problems. Softening by the lime-clarifier prevents carbonate scaling of the distillation equipment.

Figure 9:
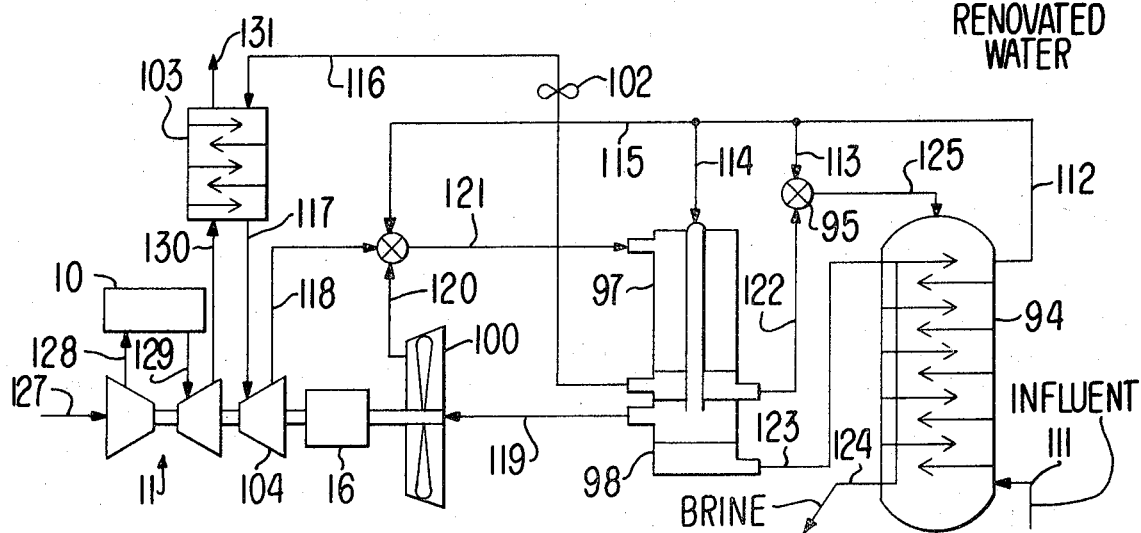
FIG. 9 is a schematic diagram of the distillation stage of the system shown in FIG. 8.

The system shown in FIGS. 8 and 9 is designed to sterilize all of the treated water but to distill only half of it since only 300 mg./l. of minerals (half of the total 700 mg./l.) need be removed to preclude mineral build-up. Because of the normal removal capability of the system described in FIG. 3, it is possible that even less than half of the water need be distilled.

The water leaving the filter downstream of the lime clarifier has had the majority of the suspended solids, dissolved organics, and bacteria removed. It still contains dissolved minerals, dissolved ammonia, and virus. It has had its bicarbonate removed by the lime clarification process.

From the filter 91, the water is pumped into a counterflow heat exchanger 94 where it is heated to 206° F. Heat is exchanged with the water leaving the process. A temperature differential of approximately 25° F. exists throughout the heat exchanger. The water is heated primarily to permit economical distillation; however, heating removes a portion of the ammonia dissolved in the water because its solubility in water reduces with increasing temperature. This reduction makes the air stripping easier later in the process. In addition, the heating provides the sterilization. Carbonate scaling of the heat exchanger is prevented since carbonate was precipitated by the previous lime process.

The heat exchanger is a simple shell and tube heat exchanger using counterflow and a relatively low temperature differential. The tubes are made of mild steel or aluminum. Since power is inexpensive because it is generated in plant and a large excess is available, high velocities are used in the tubes to reduce the heat transfer coefficients. A typical heat exchanger has an area of 195,000 square feet and a pump of 777 horsepower pumps the influent through the heat exchanger and a similar pump returns it.

Leaving the heat exchanger 94 the water flow is divided, approximately half returning directly to the counterflow heat exchanger via by-pass 95 while the remainder goes on to the distillation process. The water going directly back to the heat exchanger 94 has been sterilized by the heat. The water going on to the distillation process will be further purified by the removal of dissolved minerals. Mixing of these two streams results in a partial mineral removal, but total sterilization.

The preheated water not returned to the counter-flow heat exchanger 94 is directed to the top of the vertical tube evaporator bundle 97 and is sprayed as film onto the inside surface of each tube. Heat supplied by condensing steam on the outside surface of the tube causes the water film flowing down the inside of the tube to boil. Approximately 95 percent of the water is boiled as it descends. The remaining 5 percent collects at the bottom 98 as the effluent brine. The steam is ducted via duct 99 to the vapor compressor 100 where it is raised in pressure 5 p.s.i. to supply the necessary temperature differential for the condensing-boiling process in the vertical tubes 97. Power for the vapor compressor is supplied by the gas turbine 11.

To supply additional power to the vapor compressor 100 and to generate some electric power, some of the distillate returned via conduit 101 is passed through a boiler feed pump 102 and boiled to steam in an exhaust heat recovery boiler 103. The steam is expanded through a back pressure turbine 104 which provides added shaft horsepower to drive the compressor 100; the steam from the exhaust of the turbine 104 is mixed with steam downstream of the vapor compressor 100 and condensed on the outside of the tubes 97 of the vertical tube evaporator. An electric generator 208 adsorbs shaft power not required for the compressor and provides electric power for the plant and possibly some for sale.

The exhaust steam of the turbine 104 contributes heat to the main steam flow 105, which is desirable since it increases the temperature differential across the tubes 97, increasing the rate of heat transfer. It also has the effect of increasing the temperature of the distillate passing through conduit 101 approximately 15° F. The hot distillate through conduit 101 is mixed with the hot bypass flow through bypass 95 and passes through the counterflow heat exchanger 94 to heat up the incoming water from the filter 91. The effluent brine flow is similarly passed through the heat exchanger (in separate piping) to reduce its temperature. The main stream effluent leaves the heat exchanger via conduit 106 at approximately 84° F.

The final process before the water can be returned to the mains is to remove the ammonia by air stripping in the air stripper 92. Because the water was heated to over 206° F. in the sterilization process, a large portion of the ammonia has come out of solution, so that relatively little is left for air stripping. The air stripping also reduces the temperature of the water by convective heat transfer to the air. A granular active carbon filter 107 removes traces of any lingering taste or odor before the water is returned to the mains via conduit 108 for drinking.

There is shown in FIG. 9 a schematic or a typical distillation cycle of the system shown in FIG. 8. The following table gives the conditions of pressure and temperature as well as the flow rate at all key locations in such a typical system wherein the heat exchanger area is 195,000 square feet, the evaporator area is 275,000 square feet, the power outputs of the gas turbine 11 and steam turbine 104 are 20,000 H.P. and 8,600 H.P., respectively, the power input of the vapor compressor 100 is 18,600 H.P., and the power of electrical generator 16 is 7500 kw.

| Location | Medium | Pressure, p.s.i.a. | Temp., °F. | Flow, lb./sec. |
|---|---|---|---|---|
| 111 | Influent | 50 | 60 | 1,850 |
| 112 | Hot influent | 35 | 206 | 1,850 |
| 113 | | 35 | 206 | 925 |
| 114 | | 35 | 206 | 925 |
| 115 | | 35 | 206 | 9 |
| 116 | Boiler feed | 1,150 | 259 | 33 |
| 117 | Turbine steam | 1,150 | 750 | 33 |
| 118 | | 35 | 259 | 33 |
| 119 | | 30 | 250 | 879 |
| 120 | Product steam | 35 | 282 | 879 |
| 121 | | 35 | 259 | 921 |
| 122 | Distillate | 35 | 259 | 879 |
| 123 | Brine | 30 | 250 | 46 |
| 124 | | 30 | 85 | 46 |
| 125 | Effluent | 35 | 231 | 1,804 |
| 126 | | 15 | 85 | 1,804 |
| 127 | Air | 14.2 | 80 | 197.5 |
| 128 | | 103.4 | 584 | 197.5 |
| 129 | Combustion products | 96.4 | 1,650 | 211 |
| 130 | | 15 | 930 | 211 |
| 131 | | 15 | 300 | 211 |

What is claimed is:

1. A waste disposal and water purification apparatus comprising:
   an air compressor,
   a gas turbine,
   means connecting said turbine and said compressor for driving said compressor with said turbine,
   gasifier means for pyrolyzing said waste and generating hot fuel gases and char,
   means connected to said gasifier means for directing said hot fuel gases to said gas turbine,
   char combusting means for burning char and contaminated char and generating hot inert gases,
   means connected between said compressor and said combusting means for feeding compressed air to said combusting means,
   means connected between said combusting means and said gasifier means for directing hot inert gases to said gasifier means,
   means connected between said gasifier means and said combusting means for feeding char and contaminated char to said combusting means,
   means for mixing char with waste water thereby to adsorb contaminants from said water,
   means connected to said gasifier means for feeding char to said mixing means, and
   means connected between said mixing means and said gasifier means for removing contaminated char from said water and feeding contaminated char to said gasifier means.

2. A waste disposal and water purification apparatus comprising:
   an air compressor,
   a gas turbine,
   means connecting said turbine and said compressor for driving said compressor with said turbine,
   means for pyrolyzing waste and generating hot fuel gases and char,
   means connected to said pyrolyzing means for feeding waste to said pyrolyzing means,
   first directing means connected between said pyrolyzing means and said turbine for directing said hot fuel gases to said gas turbine to drive said turbine,
   a char combustion chamber,
   means connecting said compressor to said combustion chamber for conveying compressed air to said chamber,
   second directing means connected between said pyrolyzing means and said combustion chamber for directing a portion of the char from said pyrolyzing means to said char combustion chamber for generating hot inert gases,
   third directing means connected between said pyrolyzing means and said combustion chamber for directing said hot inert gases to said pyrolyzing means,
   means for mixing char with waste water thereby to adsorb contaminants from said water,
   means connected between said pyrolyzing means and said mixing means for transporting another portion of said char from said pyrolyzing means to said mixing means,
   means for feeding waste water to said mixing means,
   mean s connected to said mixing means for removing contaminated char from the mixed water and char, and
   means connected to said removing means for reactivating contaminated char from waste water,
   said second means directing a portion of the reactivated char to said char combustion chamber for generating hot inert gases.

3. Waste disposal and water purification apparatus as claimed in claim 2 wherein said pyrolyzing means includes an activator means connected to said transporting means for heating and activating char delivered to said mixing means from said pyrolyzing means.

4. The waste disposal and water purification apparatus of claim 2 wherein said pyrolyzing means includes a bed of inert particles and means connected to said pyrolyzing means for feeding waste into said particle bed whereby said waste is pyrolyzed in said particle bed to form said char.

5. The waste disposal and water purification apparatus of claim 2 including an inertia separator for diverting said char from said hot fuel gases in said first directing means to said transporting means for mixing with the contaminated waste water in said mixing means.

6. The waste disposal and water purification apparatus of claim 2 including lime clarifier means connected to said removing means for removing suspended solids and phosphates from water and means directing water from said char removing means to said clarifier means and means for delivering lime from the ash of said char combustion chamber to said lime clarifier for use therein.

7. The waste disposal and water purification apparatus of claim 2 wherein said mixing means comprises a first tank to which said waste water is delivered, a second tank to which the water from said first tank is delivered and means connecting said tanks, said transporting means being connected to said second tank to add char and adsorb contaminants from the water therein and wherein said means for removing the contaminated char from the water comprises a first separator means connected to said second tank for separating out the contaminated char and delivering the char to said first tank for adsorbing contaminants from the water therein and a second separator means connected to said means connecting said tanks for separating out the contaminated char from the water flowing to the second tank.

8. The waste disposal and water purification apparatus of claim 7 wherein said first and second separating means comprise inertial separators.

9. The waste disposal and water purification apparatus of claim 7 including a lime clarifier means for removing suspended solids and phosphates from water means directing water from said second tank to said clarifier means and means connecting said clarifier and chamber for delivering lime from the ash of said char combustion chamber to said lime clarifier for use therein.

10. A waste disposal and water purification apparatus comprising:
an air compressor,
a gas turbine,
means connecting said turbine and said compressor for driving said compressor with said turbine,
means for pyrolyzing waste and generating hot fuel gases and char,
means for feeding waste to said pyrolyzing means,
first directing means connected between said pyrolyzing means and said turbine for directing said hot fuel gases to said gas turbine to drive said turbine,
a char combustion chamber,
second directing means connected between said pyrolyzing means and said combustion chamber for directing a portion of the char from said pyrolyzing means to said char combustion chamber for generating hot inert gases,
means connected between said compressor and said combustion chamber for feeding compressed air to said combustion chamber,
third directing means connected between said combustion chamber and said pyrolyzing means for directing said hot inert gases to said pyrolyzing means,
means for mixing char with waste thereby to adsorb contaminants from said water,
means connected between said pyrolyzing means and said mixing means for transporting another portion of said char from said pyrolyzing means to said mixing means,
means for feeding waste water to said mixing means,
means connected between said mixing means and said pyrolyzing means for removing the contaminanted char from the mixed char and water following said mixing means and recycling said removed char to said pyrolyzing means,
lime clarifier means connected to said removing means for removing suspended solids and phosphates from water separated from contaminated char,
means connected between said combustion chamber and said lime clarifier means for delivering lime from the ash of refuse from said char combustion chamber to said lime clarifier, and
means connected between said lime clarifier and said pyrolyzing means for removing lime from said lime clarifier for recycling back to said pyrolyzing means.

11. The waste disposal and water purification apparatus of claim 10 wherein said pyrolyzing means includes activator means for heating and activating the other portion of said char of said mixing means.

12. The method of disposing of solid waste and purifying waste water comprising the steps of
drying solid waste,
pyrolyzing the dried waste with inert gases to obtain hot fuel gases and char,
burning said fuel gases to drive a gas turbine,
driving an air compressor to compress air with said gas turbine,
mixing at least a portion of said char with waste water to adsorb the contaminants therefrom,
separating the contaminated char from the waste water,
pyrolyzing the separated contaminated char,
feeding compressed air from said compressor and at least some of the pyrolyzed contaminated char to a combustion zone, and
combusting contaminated char with said compressed air to produce hot inert gas for said pyrolyzing steps.

13. The method as claimed in claim 12 including the steps of separating lime from ash produced in said combusting steps and with said lime clarifying the water after the contaminated char has been removed.

References Cited
UNITED STATES PATENTS

| | | | |
|---|---|---|---|
| 3,275,547 | 9/1966 | Bucksteeg et al. | 210—67 X |
| 3,409,545 | 11/1968 | Albertson | 210—67 X |
| 3,589,313 | 6/1971 | Smith et al. | 110—8 |
| 3,622,509 | 11/1971 | Shaler et al. | 210—32 |
| 3,244,621 | 4/1966 | Bouthilet | 210—40 |
| 3,252,899 | 5/1966 | Rice et al. | 210—40 |
| 3,300,403 | 1/1967 | Kehoe | 210—40 X |
| 3,377,271 | 4/1968 | Cann | 210—18 X |
| 3,423,309 | 1/1969 | Albertson | 210—18 X |
| 3,455,820 | 7/1969 | Joyce et al. | 210—40 |

SAMIH N. ZAHARNA, Primary Examiner

T. G. WYSE, Assistant Examiner

U.S. Cl. X.R.

110—8; 210—71, 73, 152